United States Patent Office.

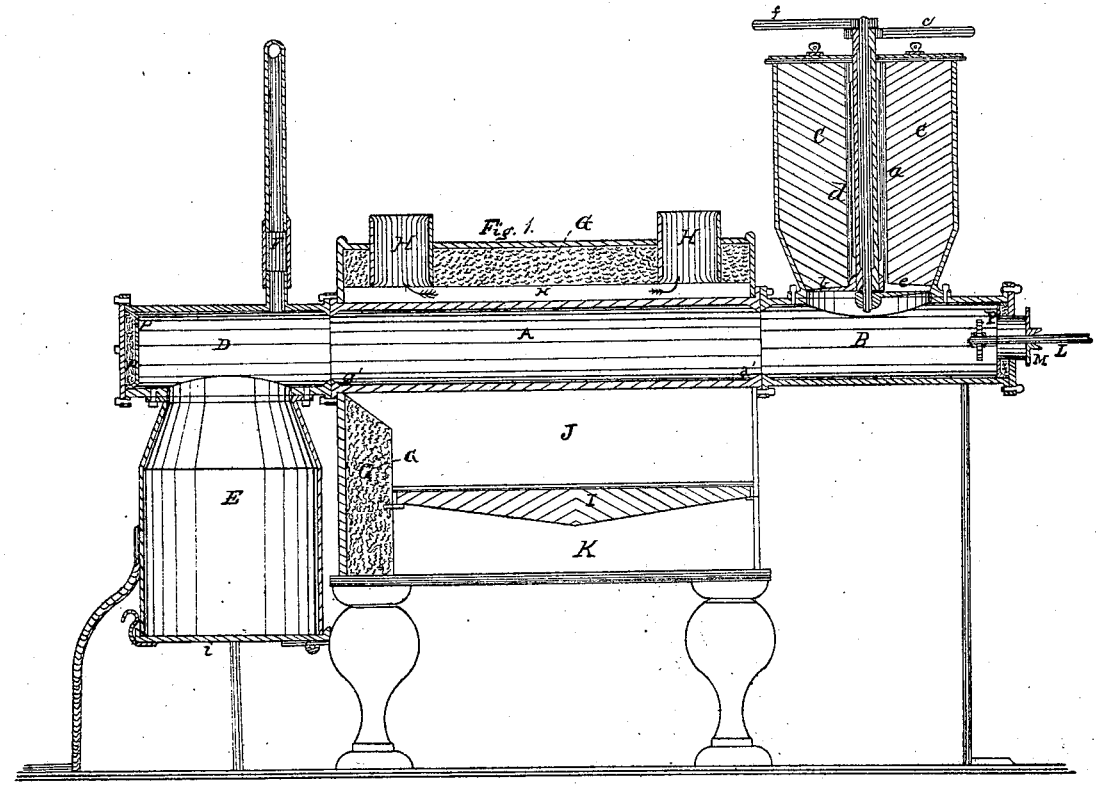
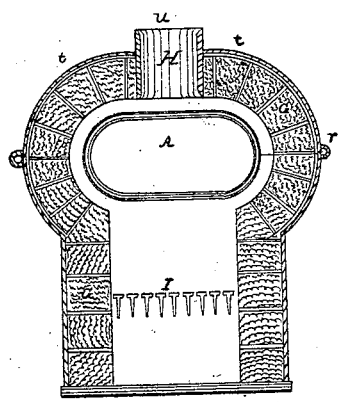
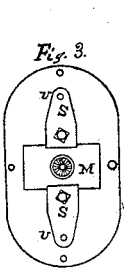
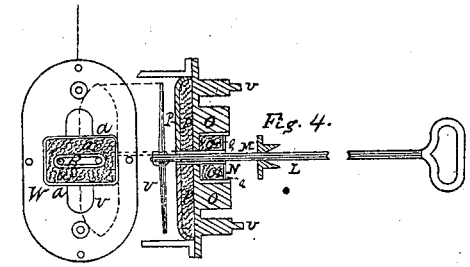

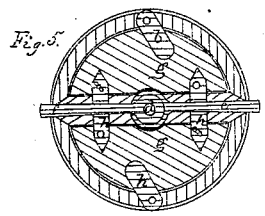
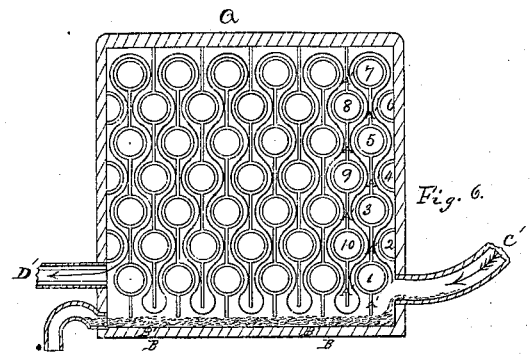
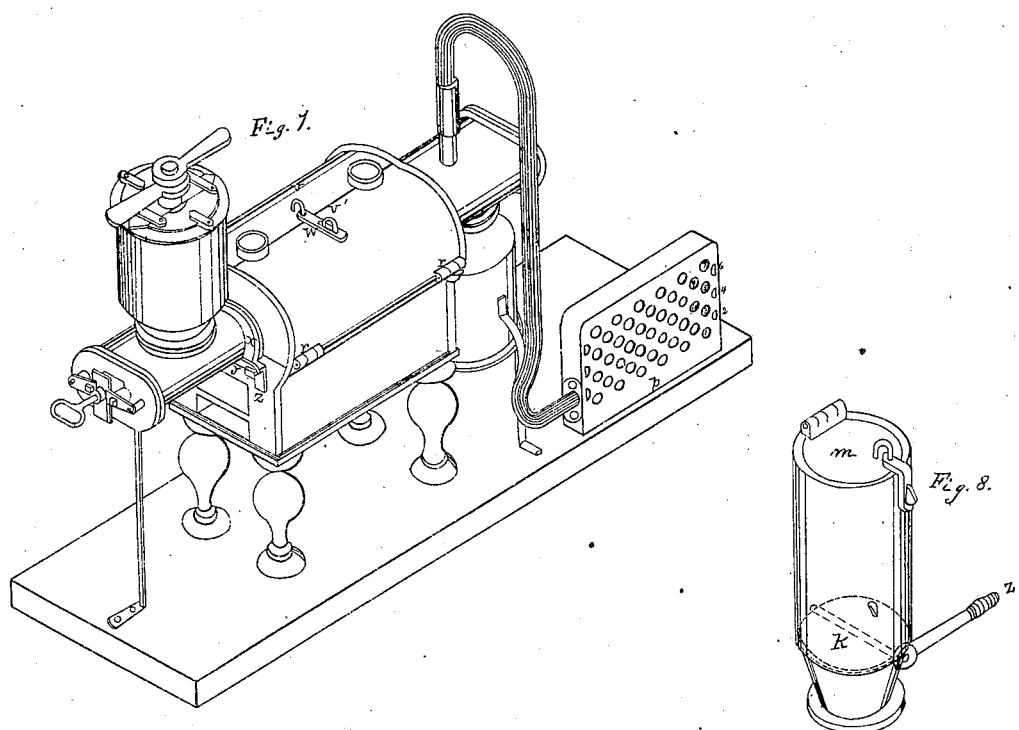
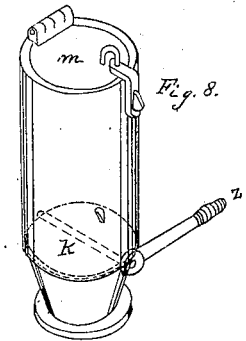

AVERY BABBETT AND W. W. BINNEY, OF AUBURN, NEW YORK.

Letters Patent No. 91,066, dated June 8, 1869.

---

IMPROVED GAS-WORKS FOR MAKING COAL-GAS.

---

The Schedule referred to in these Letters Patent and making part of the same.

---

*To whom it may concern:*

Be it known that we, AVERY BABBETT and W. W. BINNEY, of the city of Auburn, in Cayuga county, New York, have invented a new and improved Mode of Manufacturing Coal-Gas, to be hereinafter described; and we do hereby declare the following to be a full, clear, and exact description of the same, reference being had to the accompanying drawings, making a part of this specification, and to the letters of reference marked thereon.

In the manufacture of coal-gas, good success, in point of economy and large production, mainly depends upon the management of the retort. This device is employed for the purpose of distilling the coal, and is made of many sizes, proportions, and forms, and of various materials, to suit the required demand. The most common are made of cast-iron, with one open end. They are set in brick arches, with the open ends exposed to view, and so arranged that the heat will affect them uniformly the entire length. When brought to a red heat, the coal is deposited within, and the open end closed up with an iron cap, and packed air-tight with a composition made of clay and lime. If the heat is maintained at the above point, in about four hours the main portion of the gas has been set free from the coal, and passed off, through the stand-pipe, to the purifier, and to the gas-holder. The cap is then removed from the open end of the retort, when, by the ingress of the atmosphere, the floating gas within is driven out with great rapidity, and is consumed, being ignited by the operatives as it comes toward the open end of the retort. This operation is called "burning off."

One object of this invention is to save this gas, by keeping it within the retort, and also to save, in the same manner, all the gas which lies beneath the crust that forms over the coal while undergoing the process of distillation. That the coke within the retort is filled, is quite clear, from the fact, that as soon as the crust thereon is broken, and the mass stirred, the blaze, for a few minutes, is vastly increased in intensity, while the "burning-off" process continues. Now, in order to save this gas, instead of opening the retort, and drawing the coke forward, exposing it to the air, we provide a sealed coke-receiver, into which we deposit it for the space of about four hours, at least. In the operation of discharging the retort, the coke is broken into small pieces, which allows the gas that was lurking within to freely pass off, through the ordinary channel, to the receiver.

Another object of this invention is to preserve whatever gas may be generated during the process of charging. The mouth of the retort is opened for the double purpose of drawing and inserting the charges. Ordinarily, the process of charging requires much the longest time. The fresh coal being thrown directly upon the bright-red retort, the generation of gas is instantaneous and rapid, filling the retort, and rushing out at the open end with great rapidity for the space of ten to twenty minutes, more or less, until the retort is filled, the end closed, and sealed up. To effect the work of charging without opening the retort, we elongate the same, by adding thereto what we call the "charger." This is an iron casting, having the same transverse internal form and magnitude as the retort, in the clear, and about one-third its length. Immediately above this, and opening into it, we place what we call the "sealed coal-magazine." The coal is deposited in this, but is prevented from falling into the charger beneath by means of certain valves placed in the opening between the magazine and the charger. The magazine and charger are both made gas-tight. When the work of charging is to be performed, the valve between the two is opened, and the charge dropped into the charger, and, by the aid of what we call the "charging-rod," the coal is gradually moved, from the charger, into the retort. This is all accomplished without opening the retort, or exposing it to the cooling incident to the common method, or allowing the gas therein to escape.

One other object of this invention will be found in setting the retorts in iron frames lined with fire-brick, and so arranged that the case may be opened down to the retorts, for the purpose of removing or repairing the same, and then closed up, without relaying the fire-brick. This, when applied to benches of retorts, will be found to be a very great saving in expense over the old method.

Another object will be found in the mode, hereinafter described, of constructing the condenser. This is so constructed and arranged that the gas passes through it in thin layers, of not more than one-half inch in thickness, and is thrown from side to side thereof, impinging upon the surfaces of short, open pipes, open at both ends, through which the cool air may circulate freely, for the purpose of keeping the said pipes cool, and by this means more effectually condensing the gas in its passage through the condenser.

And now, in order that others may know how to make and use our invention, we will proceed to describe its construction and mode of operation.

Figure 1 is a vertical longitudinal section of the retort and the several parts connected therewith.

Figure 2 is a cross-section, showing the fire-brick, fire and ash-chamber, fire-bars, and the joints whereby the top thereof is opened for the purpose of getting at the retort.

Figure 3 is a plan of the head of the charger.

Figure 4 is a horizontal section of fig. 3, with some of the parts removed.

Figure 5 is a plan of the top of the coal-magazine.

Figure 6 is a longitudinal vertical section of the condenser.

*Assignors to themselves & Solomon N. Bierce of New York City.*

Figure 7 is an isometrical projection of the entire subject embraced within this application, and it shows the connection and relation, externally, of all the parts as they are seen when in operation.

Figure 8 represents a coal-magazine, which, when the charges are required to be made continuous, in about equal times, may be substituted for the one shown on the charger in fig. 7.

In fig. 1—

A is the retort;

B, the charger;

C, the coal-magazine;

D, the receiver;

E, the coke-magazine; and

F, the stand-pipe, used for conveying the gas from the retort to the condenser.

G is the brick-work;

H, fire-escape flues;

I, grate-bars;

J, fire-box;

K, ash-pit; and

L is the charging-rod, and is made sufficiently long to remove the coke from the retort, operating through the charger B.

This rod is fitted through a slide, M, shown in fig. 3. In fig. 4, it is raised from its bed N, for the purpose of showing all the parts more distinctly.

The cap of the chamber O has a chamber, P, on the inside thereof, filled with a non-conducting substance, and there a chamber, also, at Q, which surrounds the vertical slot R, through which the charging-rod passes to the inside of the charger.

When the slide M is placed in its seat N, the clamps S, fig. 3, are placed over it, and they are held in their places by the screws T and the steady-pins U.

The slot R has a case around it, extending through to the inside of the head or cap of the charger O, to prevent the non-conducting material from being displaced while the charging-rod is in use.

The charging-rod L has a plate, V, attached to the end thereof, for the purpose of aiding in moving the coal from the charger into the retort.

At the time of moving the coal forward, if the front end of the charging-rod is dropped, the plate V will rest on the bottom of the charger and retort; but, in drawing it back, the forward end should be raised, to avoid dragging the coal from the retort into the charger.

The edge of the plate V is shown in red shaded lines in fig. 4, and a side view in red dotted lines at W, fig. 4.

The screws T should be slackened before operating the charging-rod. This allows it to have free play up and down, without opening the charger, or in any way allowing the gas to escape.

When the rod occupies the place of the red dot in the lower end of the slot R, the plate V, attached thereto, rests upon the bottom of the charger, which lies parallel with the bottom of the retort. When the rod is raised to the opposite end, the opposite edge of the said plate comes against the top of the charger.

The tunnel-shaped mouth-piece X, projecting from the plate M, may be filled with clay-and-lime packing, while the charge is being distilled, and, if the screws T are set down, all egress from within is cut off.

The free action allowed the charging-rod enables the workmen to draw the charge with great ease, as well as to do the work of recharging in much less time than by the ordinary mode, without being subjected to the heat of the coke, or the deleterious influence of the escaped gas.

The coal-magazine C is divided into two parts by means of a partition, shown in red shaded lines at C C.

The centre of the partition is a cylinder, of sufficient size to allow of being cored out, to receive the thimble $a$.

On the lower end of this thimble is keyed the valve $b$, and on to the top is keyed the lever $c$.

Through this thimble passes the shaft $d$, on to the lower end of which is secured the valve $e$, and to the top thereof the lever $f$.

The top of the coal-magazine is shown at fig. 5, in which $g\ g$ are the caps or lids; $h\ h\ h\ h$ are the clamps for holding the lids to their places.

The joints around the shaft and thimble are well fitted, and work in oiled bearings, and are gas-tight.

The lids $g$ are packed, as it is common to pack the heads of retorts.

Now, the operation of these parts, in combination with the retort, is as follows:

The charger B is of sufficient capacity to contain an amount of coal sufficient for one charge.

By turning one of the levers $c$ or $f$, and removing one of the caps $g$, a charge of coal may be dropped through the magazine into the charger.

Then, by closing the valves, two more charges may be deposited in the magazine, and the lids $g$ closed and sealed.

Now we have three charges within the magazine and charger, sealed air-tight

When the retort is brought to the proper heat, by the aid of the charging-rod, the first charge is moved out of the charger into the retort, and the process of distillation will be complete in about four hours with suitable heat, and the gas will pass off through the stand-pipe to the condenser, &c.

The coke is then broken up by the aid of the charging-rod, and moved directly onward until it drops into the sealed coke-receiver E. There it remains for the space of four hours, until the next charge is distilled. This gives a chance for the gas remaining in the spent coal or coke to escape in the same manner above described.

Now, by turning the handle $c$ around, parallel to the lever $f$, a second charge will fall from the magazine into the charger, and may be moved forward into the retort as before, and, when distilled, moved onward into the coke-chamber, as in the other case.

Now, by turning both levers $c$ and $f$ one half revolution, the third charge will drop into the charger, and move forward into the retort, as in the two former cases.

We have worked, now, three charges, without opening the retort or its approaches, and this has consumed the time of one day, or twelve hours.

With a moderate-sized machine, from eight to fifteen hundred feet of gas can be made in this time, with a very small amount of labor.

The above description has reference to a portable gas-works, for use in private families, and for this reason it is proposed to stop at the end of twelve hours.

But if the wish is to work two or more days in succession, the first thing to be done in the morning is to make a fire under the retort. While this is heating, unclasp the lid $i$ from beneath the coke-magazine E, and drop the coke out of it. Then close up the lid $i$, and seal it as before. Then proceed to put in the charges as before described, and work them off in like manner.

Whenever the retorts are set in benches of two or more, and the charges are required to be repeated continually in about equal times, a different mode of operation would be far more desirable than the one above described.

In such a case each retort must be armed with an air-tight coal-magazine, of sufficient capacity only to hold one charge of coal.

This magazine is shown at fig. 8. It is made in the same form, at the bottom, as the one above described, for the purpose of fitting on to the charger in the same manner.

$k$ is the valve for dropping the coal from it into the charger, and is shown in red dotted lines;

$b$ is the lever for closing the valve; and $m$, the cover for closing and sealing the top.

The operation is as follows:

With the magazine open into the charger, one charge of coal is dropped into the charger through the magazine, the valve $k$ closed, and another deposited within the magazine, when the lid is shut down and sealed air-tight.

The charge within the charger is then moved forward into the retort by the aid of the charging-rod, and, when distilled, is broken up, and, by the means above described, is moved forward into the coke-magazine.

At this stage of the operation there is very little strain or pressure upon the retort or its appendages. But, during the last distillation, the gas undoubtedly has moved up and filled the spaces between the particles of coal deposited in the magazine. This is now dropped bodily into the charger, carrying with it whatever gas had permeated the coal.

Now, by closing the valve $k$, and opening the lid $m$, another charge should be deposited in the magazine before the charge in the charger is moved forward into the retort, and the lid again closed and sealed.

The second charge is now moved forward by the means above described, and the process of distillation carried on as before.

After the gas has been evolved from the second charge, the retort is again quiescent, or nearly without pressure.

If now the lid $i$, underneath the coke-magazine, be opened, the coke will drop out, but the lid should be immediately closed and packed air-tight.

All this may be accomplished without allowing any gas to escape, except the trifle lodged in the cells of the coke.

The coke, after lying four hours, will not ignite, and whatever gas lingers among the particles must be very small indeed, for the reason, that as soon as the lid $i$ is opened, the atmosphere strikes the coke, and the free gas is lifted into the magazine, and is held there by the pressure of the atmosphere.

Excluding the air from the hot coke, in a cool medium connected with the stand-pipe, has two advantages. One is, the fire goes out in the lower temperature of the coke-magazine, and the other is, the gas is retained within, and allowed to pass off into the mains.

In fig. 6, Q is the condenser. It is shown in longitudinal vertical section, cutting it through the centre.

1, 2, 3, 4, &c., are pipes, open at both ends, connected with partitions A', which, with the pipes, divide the passages through which the gas moves, every alternate one coming down into the coal-tar B', as it drips down from the stand-pipe F and enters the condenser at C'.

The partitions A' are made gas-tight where they are connected with the pipes, and the course of the gas, in its passage through the condenser, is shown by the sinuous red line, commencing at the point of the dart C', and coming out of the same at D'.

E is a tar-pool, for the purpose of allowing the tar to pass out, without allowing the gas to escape.

This arrangement of parts will accomplish the work of condensation quicker and more completely than any known method.

The first reason for this is that the current is constantly impinging upon an object cooler than the gas, and, second, the current is broken, and whatever portion escapes the cooling-effect at one time, is certain to receive it at another.

This will obviate the serious difficulty met with by Clegg, as explained in his treatise on the manufacture of coal-gas, and for the cure of which he instituted some experiments, but, not being successful, were abandoned.

The practice then was, and now is, to condense by passing the gas through from fifty to eighty feet of round iron pipe.

He says the centre of the passing column, not coming in contact with the sides of the pipe, is not condensed, because it does not come in contact with any object cooler than itself, and is not broken during its passage to the purifier.

The arrangement for opening the fire-chamber, without disturbing the brick, will be seen more distinctly in fig. 2.

$r\ r$ are the two joints or hinges.

$t\ t$, the two quarter sections.

They meet at the joint $u$, in the centre of the case, at the top.

They are held in that position by the staples V V'. (see fig. 7,) and the hasp W.

By slipping the hasp W off the staple V', one-half the entire fire-chamber can be opened down to the centre of the retort.

By this arrangement the retort may be repaired, or replaced with a new one, without relaying the fire-bricks, as is the universal practice in all gas-works, both in this country and in Europe.

Projecting from the flange $x$ of the charger is a lug, $y$, resting in a bracket, $z$.

This arrangement is applied to both sides of the charger, for the purpose of supporting the same when it is disengaged from the retort for the purpose of repairs, &c.

The receiver is supported by the legs, attached to the coke-magazine.

In fig. 1, at both ends of the retort A, will be noticed a small rise, $a'$.

This is required to prevent the coal-tar from flowing out of the retort into the charger and receiver, during the process of distillation.

Having above described the construction and mode of operating our invention,

What we claim as new, and desire to secure by Letters Patent, is—

1. The charger and charging-rod, in combination with the retort, as set forth.

2. The gas-tight coal-magazine, when constructed with valves, and operated substantially in the manner and for the purpose described, in combination with the retort.

3. The air-tight coke-magazine, when used as above set forth, in combination with the retort.

4. So arranging the fire-brick case, enclosing the retort, that a portion of the same may be opened, in such manner that the retort may be repaired or removed without relaying the fire-brick enclosing the fire-chamber, substantially as above described.

5. Depositing the spent coal or coke into an air-tight chamber, directly from the retort, said chamber being so connected with the stand-pipe as to allow the gas evolving therefrom to pass off through that channel, for the purpose specified.

6. The receiver, when connected with the retort, coke-magazine, and stand-pipe, substantially in the manner and when used for the purpose set forth.

7. The condenser, when constructed as above described, that is to say, with open pipes, so arranged that the gas, in its passage through it, shall move in a thin current, impinging upon the surfaces of said open pipes, substantially in the manner and for the purpose set forth.

8. The charging-rod L, slide M, non-conducting chambers Q and P, when all are arranged and used for the purpose above set forth.

AVERY BABBETT.
W. W. BINNEY.

Witnesses:
A. C. CODDINGTON,
CHAUNCEY A. BROWN.